United States Patent
Abe et al.

(10) Patent No.: US 10,605,165 B2
(45) Date of Patent: Mar. 31, 2020

(54) AIRCRAFT ENGINE APPARATUS

(71) Applicant: KAWASAKI JUKOGYO KABUSHIKI KAISHA, Kobe-shi, Hyogo (JP)

(72) Inventors: Akihito Abe, Kobe (JP); Tatsuhiko Goi, Kobe (JP); Masahide Kazari, Akashi (JP); Hidenori Arisawa, Kakogawa (JP)

(73) Assignee: KAWASAKI JUKOGYO KABUSHIKI KAISHA, Hyogo, Kobe-shi (JP)

( * ) Notice: Subject to any disclaimer, the term of this patent is extended or adjusted under 35 U.S.C. 154(b) by 132 days.

(21) Appl. No.: 15/539,245

(22) PCT Filed: Nov. 4, 2015

(86) PCT No.: PCT/JP2015/005520
§ 371 (c)(1),
(2) Date: Jun. 23, 2017

(87) PCT Pub. No.: WO2016/103550
PCT Pub. Date: Jun. 30, 2016

(65) Prior Publication Data
US 2017/0362999 A1   Dec. 21, 2017

(30) Foreign Application Priority Data

Dec. 24, 2014   (JP) ................................ 2014-260650

(51) Int. Cl.
*F02C 7/04*   (2006.01)
*F02K 3/06*   (2006.01)
(Continued)

(52) U.S. Cl.
CPC ................ *F02C 7/04* (2013.01); *B64C 11/02* (2013.01); *B64D 33/02* (2013.01); *F01D 25/24* (2013.01);
(Continued)

(58) Field of Classification Search
CPC ...... F02C 7/04; F02C 7/32; F02C 7/18; F02C 7/00; B64C 11/14; B64C 11/02;
(Continued)

(56) References Cited

U.S. PATENT DOCUMENTS 4,704,862 A   11/1987  Dennison et al.
4,722,666 A   2/1988   Dennison et al.
(Continued)

FOREIGN PATENT DOCUMENTS

GB   2 198 791 A    6/1988
JP   61-275550 A   12/1986
(Continued)

OTHER PUBLICATIONS

Written Opinion of the International Searching Authority of PCT/JP2015/005520 dated Jan. 26, 2016.
(Continued)

*Primary Examiner* — Kevin A Lathers
(74) *Attorney, Agent, or Firm* — Sughrue Mion, PLLC

(57) ABSTRACT

An aircraft engine apparatus (1) includes: a rotating shaft (6); a fan (10) driven by the rotating shaft; a fan case surrounding the fan from outside in a radial direction of the rotating shaft; a nose cone (13) disposed upstream of the fan; a casing (2) that accommodates at least part of the rotating shaft and supports the fan case; a first motive force transmitter (9) that transmits motive force of the rotating shaft to the fan; and a support member (12) disposed inward of the first motive force transmitter in the radial direction, the support member coupling the nose cone to the casing such
(Continued)

that the support member supports the nose cone in a stationary state.

10 Claims, 5 Drawing Sheets

(51) Int. Cl.
| | |
|---|---|
| *B64C 11/02* | (2006.01) |
| *B64D 33/02* | (2006.01) |
| *F02C 7/18* | (2006.01) |
| *F02C 7/32* | (2006.01) |
| *F02C 7/36* | (2006.01) |
| *F02C 7/00* | (2006.01) |
| *F01D 25/24* | (2006.01) |

(52) U.S. Cl.
CPC .................. *F02C 7/00* (2013.01); *F02C 7/18* (2013.01); *F02C 7/32* (2013.01); *F02C 7/36* (2013.01); *F02K 3/06* (2013.01); *B64D 2033/024* (2013.01); *F05D 2260/20* (2013.01); *F05D 2260/40311* (2013.01); *Y02T 50/671* (2013.01); *Y02T 50/675* (2013.01)

(58) Field of Classification Search
CPC ... B64D 33/02; B64D 2033/024; F01D 25/24; F05D 2260/40311; F05D 2260/20; Y02T 50/675; Y02T 50/671
USPC ...................................................... 415/122.1
See application file for complete search history.

(56) References Cited

U.S. PATENT DOCUMENTS

| | | | | |
|---|---|---|---|---|
| 5,692,372 | A * | 12/1997 | Whurr ....................... | F01C 1/22 60/226.1 |
| 2013/0008145 | A1* | 1/2013 | Sundstrom ................ | F02K 1/12 60/226.2 |
| 2013/0259638 | A1 | 10/2013 | Suciu et al. | |
| 2013/0324343 | A1* | 12/2013 | Gallet ..................... | F02C 3/107 475/159 |

FOREIGN PATENT DOCUMENTS

| | | |
|---|---|---|
| JP | 64-19124 A | 1/1989 |
| JP | 2010-179815 A | 8/2010 |
| JP | 2013-199936 A | 10/2013 |
| WO | 2006059996 A1 | 6/2006 |
| WO | 2012/137843 A1 | 10/2012 |

OTHER PUBLICATIONS

International Search Report of PCT/JP2015/005520 dated Jan. 26, 2016.
International Search Report of PCT/JP2015/005529 dated Jan. 26, 2016.

* cited by examiner

AIRCRAFT ENGINE APPARATUS

CROSS REFERENCE TO RELATED APPLICATIONS

This application is a National Stage of Application No. PCT/JP2015/005520 filed Nov. 4, 2015, claiming priority based on Japanese Patent Application No. 2014-260650 filed Dec. 24, 2014, the contents of all of which are incorporated herein by reference in their entirety.

TECHNICAL FIELD

The present invention relates to an aircraft engine apparatus.

BACKGROUND ART

In an aircraft turbine engine, at the center in its radial direction, a nose cone that has a conoid shape and whose diameter is reduced forward is provided upstream of a fan. Usually, the nose cone is fixed to the hub of the fan and rotates integrally with the fan. Meanwhile, Patent Literature 1 discloses a configuration in which, at the upstream side of the fan, flow-rectifying guide blades (stationary blades) extend between the nose cone and the fan case. In this configuration, the radially inner ends of the guide blades are fixed to the nose cone, and the radially outer ends of the guide blades are fixed to the fan case. Therefore, the nose cone stays stationary even while the fan is rotating.

CITATION LIST

Patent Literature

PTL 1: Japanese Laid-Open Patent Application Publication No. 2013-199936

SUMMARY OF INVENTION

Technical Problem

However, in the case of adopting the guide blades disclosed in Patent Literature 1 in an attempt to keep the nose cone stationary while the fan is rotating, it is necessary to carefully design the shape of the guide blades from the viewpoint of fluid dynamics so that the guide blades will not hinder the flow of air flowing into the fan. Moreover, since the guide blades extend radially outward from the nose cone and are connected to the fan case, the size of the guide blades in the radial direction is great, which causes an increase in the overall weight of the engine.

In view of the above, an object of the present invention is to, in an aircraft engine, reduce the burden of designing and suppress an increase in the weight while allowing the nose cone to be kept stationary.

Solution to Problem

An aircraft engine apparatus according to one aspect of the present invention includes: a rotating shaft; a fan driven by the rotating shaft; a fan case surrounding the fan from outside in a radial direction of the rotating shaft; a nose cone disposed upstream of the fan; a casing that accommodates at least part of the rotating shaft and supports the fan case; a first motive force transmitter that transmits motive force of the rotating shaft to the fan; and a support member disposed inward of the first motive force transmitter in the radial direction, the support member coupling the nose cone to the casing such that the support member supports the nose cone in a stationary state.

According to the above configuration, the support member, which supports the nose cone in a stationary state, is disposed radially inward of the first motive force transmitter. Therefore, unlike conventional guide blades, it is not necessary to carefully design the shape of the support member from the viewpoint of fluid dynamics so that the support member will not hinder the flow of air flowing into the fan. In addition, since the support member is disposed radially inward of the first motive force transmitter, an increase in the size of the support member in the radial direction can be suppressed, and thereby an increase in the weight can be suppressed.

Advantageous Effects of Invention

The present invention makes it possible to, in an aircraft engine apparatus, reduce the burden of designing and suppress an increase in the weight while allowing the nose cone to be kept stationary.

DESCRIPTION OF EMBODIMENTS

Hereinafter, embodiments of the present invention are described with reference to the drawings. It should be noted that, in the description below, the term "upstream" refers to upstream in the direction of air flowing inside an engine unless otherwise specified. Similarly, the term "downstream" refers to downstream in the direction of air flowing inside the engine unless otherwise specified. That is, the term "upstream side" refers to the side at which a fan is provided in the axial direction of a rotating shaft of the engine, and the "downstream side" refers to the side at which a tail cone is provided in the axial direction of the rotating shaft of the engine. The term "radial direction" or "radially" refers to the radial direction with reference to the axial direction of the rotating shaft of the engine unless otherwise specified. Similarly, the term "circumferential direction" or "circumferentially" refers to the circumferential direction with reference to the axial direction of the rotating shaft of the engine unless otherwise specified.

Embodiment 1

Figure 1:
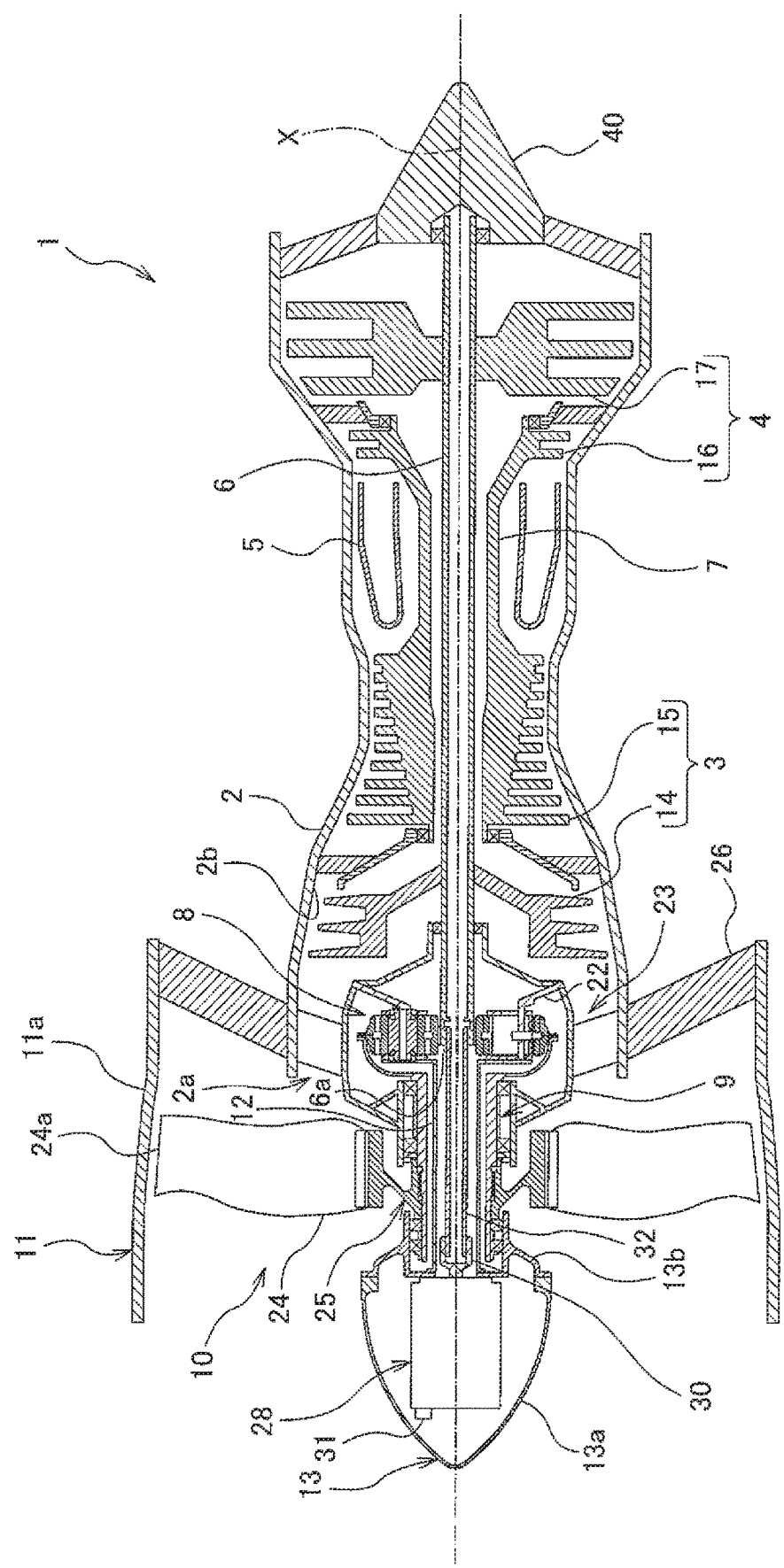
FIG. 1 is a sectional view showing an aircraft engine apparatus according to Embodiment 1.
Figure 2:
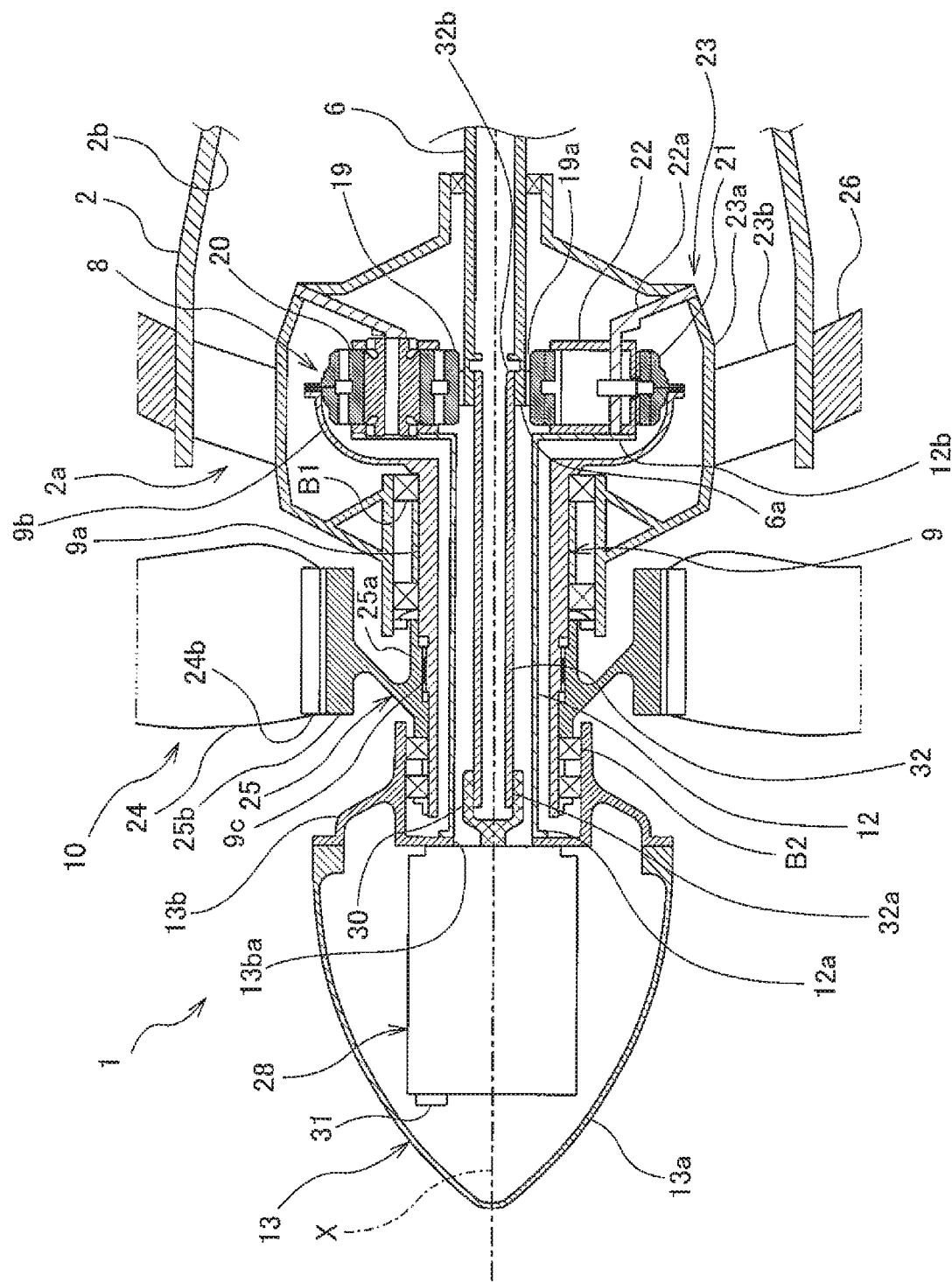
FIG. 2 is an enlarged sectional view of a fan and its vicinity of the aircraft engine apparatus according to Embodiment 1.

FIG. 1 is a sectional view showing an aircraft engine apparatus 1 (which may be hereinafter referred to as an "engine apparatus 1") according to Embodiment 1. FIG. 2 is an enlarged sectional view of a fan 10 and its vicinity of the aircraft engine apparatus 1. As shown in FIG. 1 and FIG. 2, as one example, the engine apparatus 1 is a biaxial gas turbine engine of a GTF (Geared Turbo Fan) type, and includes a casing 2, a compressor 3, a turbine 4, a combustor 5, a low-pressure shaft 6, a high-pressure shaft 7, a transmission 8, a coupling member 9, the fan 10, a fan case 11, a torque tube 12, a nose cone 13, and a power generator 28. That is, the engine apparatus 1 includes an engine and aircraft equipment (a power generator).

The casing 2 is a cylindrical casing, and extends in the longitudinal direction of the engine apparatus 1. The casing 2 accommodates at least part of the low-pressure shaft 6, and supports the fan case 11. Specifically, the casing 2 accommodates the compressor 3, the turbine 4, the combustor 5, the low-pressure shaft 6, the high-pressure shaft 7, the transmission 8, and the coupling member 9. The compressor 3 is disposed at the upstream side inside the casing 2. The turbine 4 is disposed at the downstream side inside the casing 2. The combustor 5 is disposed between the compressor 3 and the turbine 4. The compressor 3 includes an upstream-side low-pressure compressor 14 and a downstream-side high-pressure compressor 15.

The turbine 4 includes an upstream-side high-pressure turbine 16 and a downstream-side low-pressure turbine 17. Each of the high-pressure turbine 16 and the low-pressure turbine 17 is driven to rotate when the engine apparatus 1 is driven. The low-pressure shaft 6 (rotating shaft) extends in the longitudinal direction of the engine apparatus 1, and is pivotally supported around an axis X of the engine apparatus 1. The low-pressure compressor 14 and the low-pressure turbine 17 are coupled to the low-pressure shaft 6. The high-pressure shaft 7 (rotating shaft) is pivotally supported around the axis X in a state where the low-pressure shaft 6 is inserted in the high-pressure shaft 7. The high-pressure compressor 15 and the high-pressure turbine 16 are coupled to the high-pressure shaft 7. The combustor 5 is provided between the casing 2 and the high-pressure shaft 7 inside the casing 2.

The inner space of the casing 2 is open to the outside on both sides in its longitudinal direction. Through a passage 2a formed at the upstream side in the engine apparatus 1, outside air is introduced toward the downstream side. A tail cone 40 is provided at the downstream side of the casing 2. The fan case 11 is a cylindrical case whose diameter is greater than that of the casing 2, and is disposed at the upstream side of the casing 2. The fan 10 is accommodated in the inner space of the fan case 11, and the fan case 11 surrounds the fan 10. The driving force of the low-pressure shaft 6 is transmitted to the fan 10. The thrust force of the engine apparatus 1 is obtained from: a jet stream of combustion gas jetted out from the combustor 5 to the downstream side passing around the tail cone 40; and a high-speed air stream jetted out from the fan 10 to the downstream side passing around the casing 2.

The transmission 8 is provided between the low-pressure shaft 6 and the coupling member 9, and is disposed downstream of the fan 10 and upstream of the compressor 3. The transmission 8 includes: a sun gear 19; a plurality of planetary gears 20 arranged at intervals around the sun gear 19 and meshed with the sun gear 19; a ring gear 21 provided in a manner to surround the outer periphery of each planetary gear 20 and including internal teeth meshed with the planetary gears 20; and a carrier 22 pivotally supporting the planetary gears 20. The transmission 8 herein is a star-type planetary gear mechanism, in which the planetary gears 20 do not revolve.

Specifically, as described below, the carrier 22 is coupled to the casing 2, and is fixed at a predetermined position between the sun gear 19 and the ring gear 21. Thus, in the transmission 8, the carrier 22 is configured as an unmovable (stationary) part fixed at the predetermined position. Each of the planetary gears 20 is positioned at a predetermined position in the circumferential direction of the sun gear 19 by the carrier 22, which is the unmovable part of the transmission 8, and is pivotally supported at the predetermined position by the carrier 22. An insertion hole 19a is formed in the central portion of the sun gear 19. The sun gear 19 is coupled to the low-pressure shaft 6 in a state where one end portion 6a of the low-pressure shaft 6 is inserted in the insertion hole 19a. The carrier 22 includes at least one extended portion 22a, which extends in the radial direction toward an inner peripheral surface 2b of the casing 2.

A support structure 23 coupled to the casing 2 is provided inside the casing 2. The support structure 23 includes a body portion 23a and a plurality of supporting arms 23b extending from the body portion 23a. The body portion 23a has a cylindrical shape, and accommodates the transmission 8 therein. Each of the supporting arms 23b extends radially inward from the inner peripheral surface 2b of the casing 2, and is connected to the body portion 23a.

The extended portion 22a of the carrier 22 is coupled to the body portion 23a. In this manner, the carrier 22 is coupled to the casing 2 via the support structure 23. The transmission 8 is used as a FDGS (Fan Drive Gear System) that reduces the rotational speed of the fan 10 to be lower than the rotational speed of the low-pressure shaft 6.

The transmission 8 reduces and transmits part of the rotational driving force of the low-pressure shaft 6 to the fan 10. The coupling member 9, which is a cylindrical hollow member extending in the direction of the axis X, is coupled to the ring gear 21 of the transmission 8, and the coupling member 9 is also coupled to the fan 10. The coupling member 9 is used as a first motive force transmitter, which is coupled to the low-pressure shaft 6 and the fan 10 and which transmits part of the driving force of the low-pressure shaft 6 to the fan 10. Specifically, the coupling member 9 is coupled to the low-pressure shaft 6 via the transmission 8. The coupling member 9 includes: a tubular body portion 9a extending in the direction of the axis X of the low-pressure shaft 6; and an expanded diameter portion 9b provided on one end of the body portion 9a, the one end being adjacent to the transmission 8. The expanded diameter portion 9b is coupled to the ring gear 21 while covering part of the outer periphery of the ring gear 21. A bearing B1 is provided between the support structure 23 and the outer peripheral surface of the body portion 9a of the coupling member 9. Accordingly, the coupling member 9 is supported by the support structure 23, such that the coupling member 9 is rotatable around the axis X.

The fan 10 includes: a fan hub 25; and a plurality of fan blades 24, which are coupled to the fan hub 25 such that they are arranged at intervals in the circumferential direction and extend in a radial manner. A distal end portion 24a of each of the fan blades 24 is covered by the annular fan case 11. The fan case 11 is supported by the casing 2 via a plurality of fixing vanes 26. An outer peripheral surface 11a of the fan case 11 is supported by a nacelle (not shown) extending in the longitudinal direction of the engine apparatus 1. Part of outside air fed from the fan 10 passes through an air passage formed between the casing 2 and the nacelle from the upstream side toward the downstream side of the engine apparatus 1.

The fan hub 25 includes a cylindrical base portion 25a and a plurality of joint portions 25b provided around the base portion 25a. The fan hub 25 is coupled to a groove 9c formed in the peripheral surface of the body portion 9a by spline coupling in a state where the body portion 9a of the coupling member 9 is inserted in the base portion 25a. Accordingly, the fan 10 is coupled to the coupling member 9 and driven by the low-pressure shaft 6. A proximal end portion 24b of each of the fan blades 24 is coupled to a corresponding one of the joint portions 25b. It should be noted that the fan blades 24 and the fan hub 25 may be integrally formed.

A downstream end portion of the nose cone 13 is fitted to one end portion of the coupling member 9 via a bearing B2, the one end portion being adjacent to the fan 10. The nose cone 13 includes: a cone portion 13a having a conoid shape, which is positioned upstream of the fan 10 at the center in the radial direction and whose diameter is reduced forward; and a base portion 13b fixed to the downstream end portion of the cone portion 13a. The base portion 13b is, for example, a sleeve-like portion. The base portion 13b of the nose cone 13 is fitted to one end portion of the coupling member 9 via the bearing B2. The nose cone 13 is supported by the coupling member 9 via the bearing B2, such that the nose cone 13 is rotatable relative to the coupling member 9. In this manner, the nose cone 13 is positioned and supported by the coupling member 9 in the radial direction.

Upstream of the fan 10, the nose cone 13 is mechanically spaced apart from the fan case 11. That is, radially outward of the nose cone 13 and upstream of the fan 10, the nose cone 13 is not connected to the fan case 11. Thus, upstream of the fan 10, there is no guide blade coupling the nose cone 13 and the fan case 11. Accordingly, between the outer peripheral surface of the nose cone 13 and the inner peripheral surface of the fan case 11, an annular space is continuously formed around the nose cone 13 from the upstream end of the nose cone 13 to the upstream end of the fan 10 in the direction of the axis X.

Radially inward of the coupling member 9 and radially outward of a drive shaft 32, the torque tube 12, which is a hollow support member supporting the nose cone 13, is disposed. The torque tube 12 extends in the direction of the axis X inside the body portion 9a of the coupling member 9. One end portion 12a of the torque tube 12 is coupled to the base portion 13b of the nose cone 13, and the other end portion 12b of the torque tube 12 is coupled to the carrier 22, which is the unmovable part of the transmission 8. In this manner, the torque tube 12 is coupled to the casing 2 via the carrier 22, and positions and restricts the nose cone 13 in the rotation direction. That is, the torque tube 12 couples the nose cone 13 to the casing 2, such that the torque tube 12 supports the nose cone 13 in a stationary state when the fan 10 rotates. Although the torque tube 12 herein is configured to be coupled to the base portion 13b of the nose cone 13, the manner of coupling the torque tube 12 is not thus limited, so long as the torque tube 12 is coupled to the nose cone 13. For example, the torque tube 12 may be coupled to the cone portion 13a.

The power generator 28 is accommodated in the inner space of the nose cone 13. The power generator 28 is one example of aircraft equipment provided in the nose cone 13. In the present embodiment, the power generator 28 is fixed to the base portion 13b of the nose cone 13. Accordingly, the torque tube 12 positions and restricts not only the nose cone 13 but also the power generator 28 in both the radial direction and the rotation direction. The drive shaft 32, which transmits the driving force of the low-pressure shaft 6 to a generator input shaft 30 of the power generator 28, is provided radially inward of the coupling member 9 (the first motive force transmitter). The drive shaft 32 is used as a second motive force transmitter, which transmits part of the driving force of the low-pressure shaft 6 to the power generator 28.

The generator input shaft 30 of the power generator 28 passes through an opening 13ba of the base portion 13b of the nose cone 13, and protrudes toward the drive shaft 32. One end portion 32a of the drive shaft 32 is coupled to the generator input shaft 30 of the power generator 28 by spline coupling, and the other end portion 32b of the drive shaft 32 is inserted in the one end portion 6a of the low-pressure shaft 6 and coupled thereto by spline coupling. The one end portion 6a of the low-pressure shaft 6 is inserted in the sun gear 19 of the transmission 8 and coupled thereto. Part of the driving force of the low-pressure shaft 6 is transmitted to the generator input shaft 30 via the drive shaft 32, and the power generator 28 generates electric power by being driven at the same rotational speed as the rotational speed of the low-pressure shaft 6.

In the radial direction, the torque tube 12 is disposed in a gap between the coupling member 9 and the drive shaft 32. Thus, in the engine apparatus 1, a motive force transmitting path extending from the low-pressure shaft 6 to the fan 10, the torque tube 12 supporting the nose cone 13 and the power generator 28, and a motive force transmitting path extending from the low-pressure shaft 6 to the power generator 28 are arranged in this order from the outer side to the inner side in the radial direction.

Electric power generated by the power generator 28 is supplied to external equipment via a terminal 31. Wiring connected to the terminal 31 of the power generator 28 is, for example, extended along the outer periphery of the torque tube 12 through an insertion hole (not shown) formed in the base portion 13b of the nose cone 13. The wiring is further extended along the support structure 23 and the fixing vanes 26, and thereby taken out of the engine apparatus 1. In this manner, the wiring can be installed so that the wiring will not hinder the rotation of the ring gear 21, the coupling member 9, and the fan 10 and the rotation of the generator input shaft 30 and the drive shaft 32.

In the above-described configuration, the torque tube 12, which supports the nose cone 13 in a stationary state, is disposed radially inward of the coupling member 9. Therefore, unlike conventional guide blades, it is not necessary to carefully design the shape of the torque tube 12 from the viewpoint of fluid dynamics so that the torque tube 12 will not hinder the flow of air flowing into the fan 10. In addition, since the torque tube 12 is disposed radially inward of the coupling member 9, an increase in the size of the torque tube 12 in the radial direction can be suppressed, and thereby an increase in the weight can be suppressed. This makes it possible to, in the aircraft engine apparatus 1, reduce the burden of designing and suppress an increase in the weight while allowing the nose cone 13 to be kept stationary.

Since the nose cone 13 is kept stationary while the fan 10 is rotating, a line of air flow that is guided by the nose cone 13 toward the fan blades 24 is prevented from becoming curved and unstable due to the rotational external force of the nose cone 13. As a result, the air flow around the nose cone 13 is stabilized, and a transition point where a laminar flow changes into a turbulent flow can be shifted to the downstream side. Consequently, the thickness of a turbulent boundary layer at the inlet of the fan blades 24 can be made thin, and a region where the fan efficiency is lowered due to the turbulent flow can be reduced.

Moreover, since the nose cone 13 is a non-rotating body, it is not necessary, for example, to make the shape of the nose cone 13 axisymmetric, and the degree of freedom in terms of the shape of the nose cone 13 is increased. Furthermore, since the nose cone 13 is a non-rotating body, centrifugal force and so forth exerted on the nose cone 13 are eliminated. As a result, the rigidity that the nose cone 13 is required to have is reduced, which makes it possible to reduce the weight of the nose cone 13.

In the present embodiment, the power generator 28 is exemplified as the aircraft equipment accommodated in the nose cone 13. However, the aircraft equipment accommodated in the nose cone 13 is not limited to the power generator 28, but may be any other aircraft equipment that is driven by the drive shaft 32 to operate (e.g., a pump).

Embodiment 2

Figure 3:
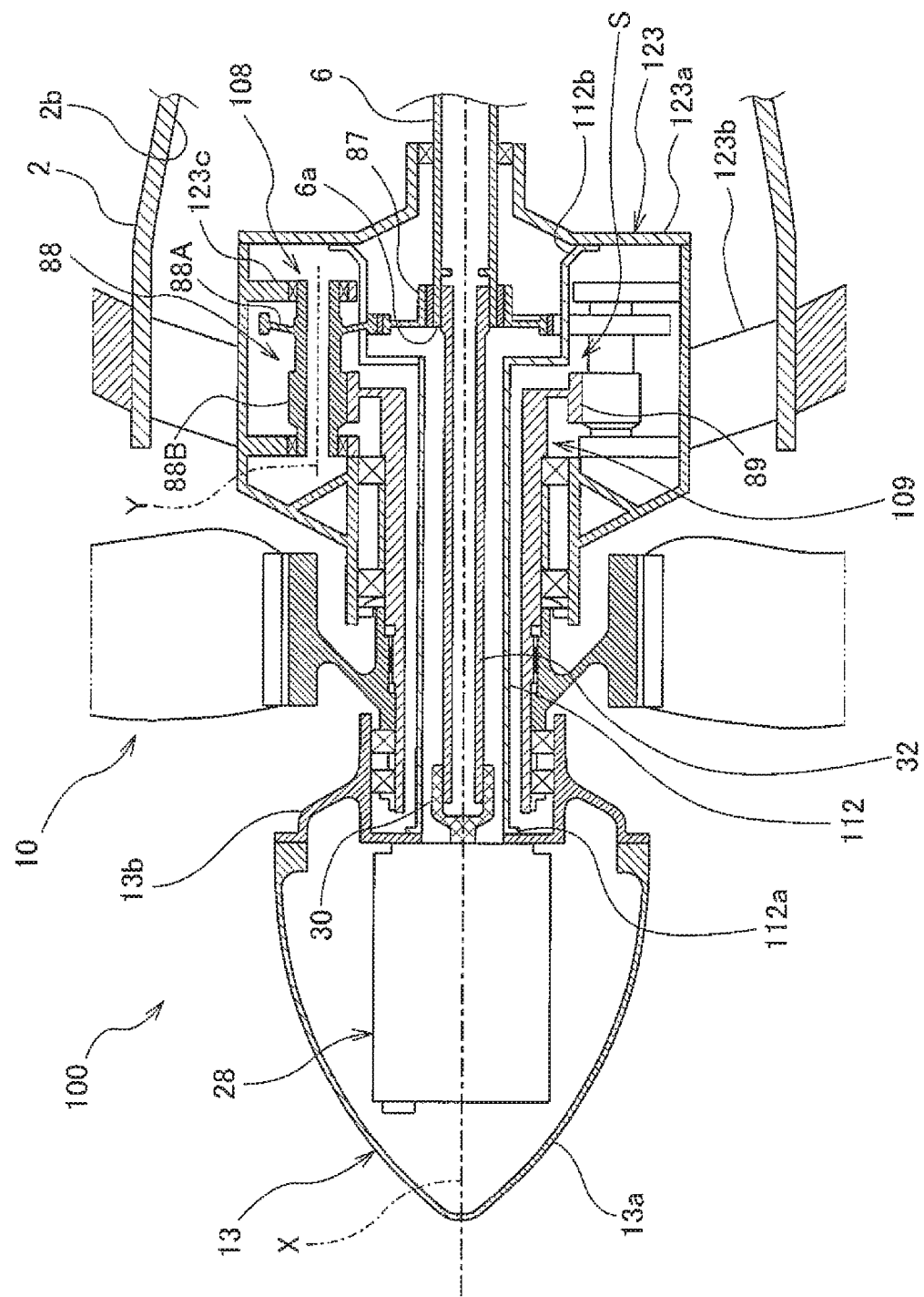
FIG. 3 is an enlarged sectional view of a fan and its vicinity of an aircraft engine apparatus according to Embodiment 2.

FIG. 3 is an enlarged sectional view of the fan 10 and its vicinity of an aircraft engine 100 according to Embodiment 2. As shown in FIG. 3, a transmission 108 provided in the engine 100 includes: an input gear 87, a plurality of (five as one example) two-stage gears 88, and an output gear 89. The transmission 108 is accommodated in a cylindrical body portion 123a of a support structure 123.

The input gear 87 is provided on the one end portion 6a of the low-pressure shaft 6, and transmits the rotational driving force of the low-pressure shaft 6 to each of the two-stage gears 88. Each of the plurality of two-stage gears 88 includes a first gear 88A and a second gear 88B. The first gear 88A is meshed with the input gear 87. The second gear 88B is meshed with the output gear 89. The number of teeth of the first gear 88A is different from that of the second gear 88B. As one example, the number of teeth of the first gear 88A is set to be larger than the number of teeth of the second gear 88B. The two-stage gears 88 are arranged to be spaced apart from one another in the circumferential direction of the low-pressure shaft 6 in a state where a rotational axis Y of each two-stage gear 88 is parallel to the axial direction of the generator input shaft 30.

Each of the two-stage gears 88 is pivotally supported by a carrier 123c, which is provided inside the body portion 123a of the support structure 123. The output gear 89 is provided integrally with a coupling member 109 and positioned on the other end side of the coupling member 109. The output gear 89 transmits the rotational driving force of each of the two-stage gears 88 to the fan 10 via the coupling member 109. Thus, in the engine 100, part of the rotational driving force of the low-pressure shaft 6 is transmitted to the fan 10 via the input gear 87, the two-stage gears 88, the output gear 89, and the coupling member 109 sequentially.

The transmission 108 includes a space S, through which a torque tube 112 passes from the upstream side to the downstream side. Specifically, the torque tube 112 extends from the inner space of the cylindrical coupling member 109, which extends in the direction of the axis X, to the downstream side of the input gear 87 through gaps between adjacent two-stage gears 88 (i.e., through the space S). In this manner, one end portion 112a of the torque tube 112 is coupled to the nose cone 13, and the other end portion 112b of the torque tube 112 is coupled to the body portion 123a of the support structure 123. The support structure 123 is supported by the inner peripheral surface 2b of the casing 2 via supporting arms 123b. In this manner, the nose cone 13 is coupled to the casing 2 via the torque tube 112 and the support structure 123. Thus, the torque tube 112 and the support structure 123 couple the casing 2 and the nose cone 13 together, and are used as support members supporting the nose cone 13. It should be noted that components common between Embodiment 1 and Embodiment 2 are denoted by the same reference signs, and the description of such common components is omitted in Embodiment 2.

Embodiment 3

Figure 4:
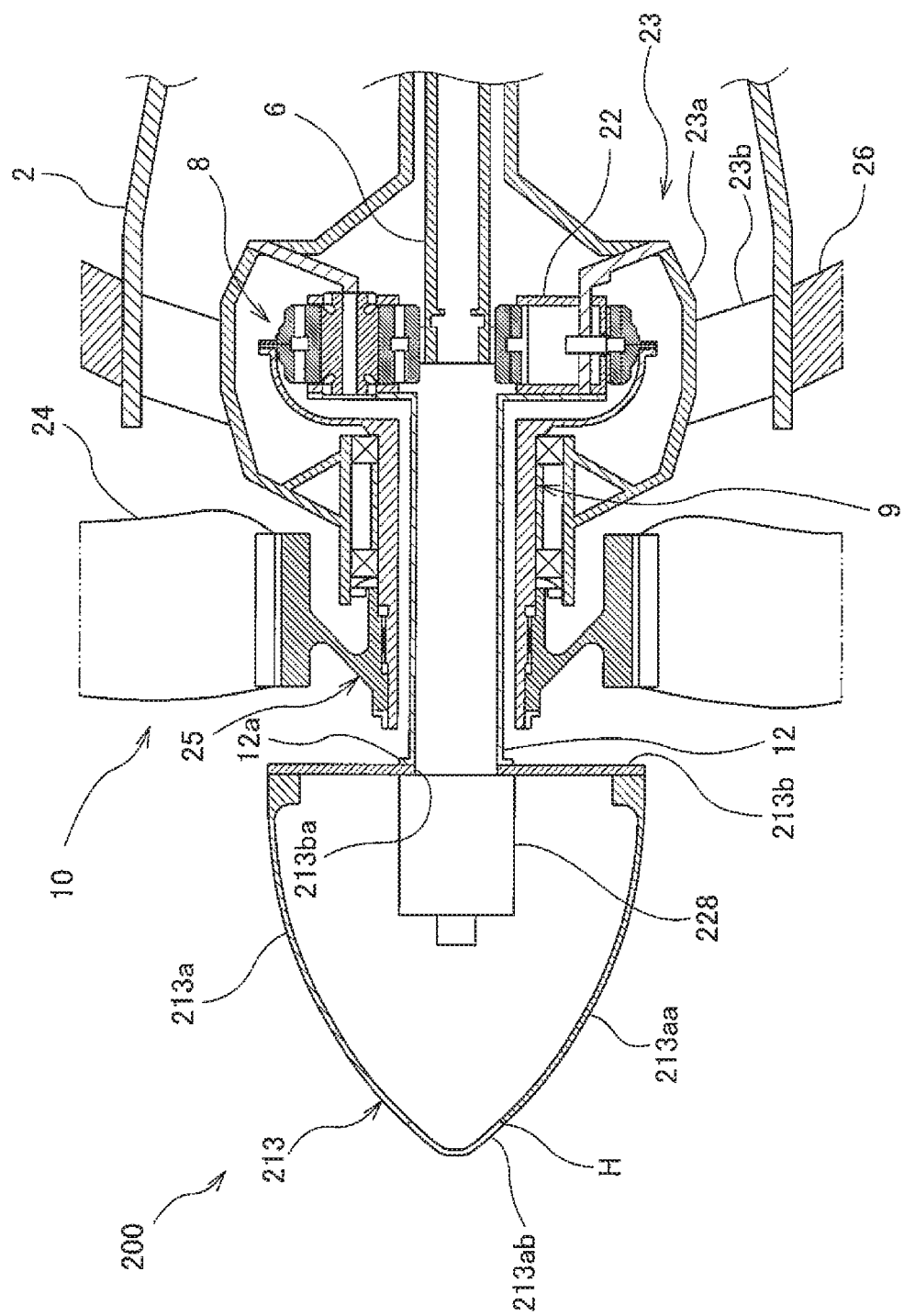
FIG. 4 is an enlarged sectional view of a fan and its vicinity of an aircraft engine apparatus according to Embodiment 3.

FIG. 4 is an enlarged sectional view of the fan 10 and its vicinity of an aircraft engine 200 according to Embodiment 3. As shown in FIG. 4, a nose cone 213 includes: a cone portion 213a having a conoid shape, which is positioned upstream of the fan 10 at the center in the radial direction and whose diameter is reduced forward; and a base portion 213b fixed to the downstream end portion of the cone portion 213a. The cone portion 213a is, at least partly, formed as a transparent portion. As one example, the cone portion 213a includes: a non-transparent cone body portion 213aa, the upstream end of which is provided with a window opening H and which is in the shape of a circular truncated cone; and a conoid and transparent sealing portion 213ab, which is fixed to the cone body portion 213aa in a manner to seal the window opening H.

The base portion 213b is a plate-shaped member that seals an opening formed at the downstream end of the cone portion 213a, and is spaced apart from the coupling member 9. That is, radially outward of the torque tube 12 and upstream of the fan 10, the nose cone 213 is mechanically spaced apart from the coupling member 9. The base portion 213b of the nose cone 213 is fixed to the torque tube 12 coupled to the carrier 22 of the transmission 8. With this configuration, the nose cone 213 is supported such that the nose cone 213 is kept stationary even while the fan 10 is rotating.

A camera 228 is provided in the nose cone 213. The camera 228 is aircraft equipment that optically accesses the outside of the nose cone 213. Specifically, the camera 228 is accommodated in the nose cone 213 so that an image of the view in front of the engine apparatus 200 can be taken through the transparent sealing portion 213ab. The camera 228 is fixed to the base portion 213b of the nose cone 213, and wiring (not shown) of the camera 228 is extended to the outside of the nose cone 213 through an opening 213ba of the base portion 213b. Since the camera 228 is equipment that does not need mechanical driving force, no drive shaft is disposed in the inner space of the torque tube 12. Although the camera 228 is accommodated in the nose cone 213 as aircraft equipment in the present embodiment, the aircraft equipment accommodated in the nose cone 213 is not limited to the camera 228, but may be any other aircraft equipment that accesses the outside of the nose cone 213 by radio waves, by sound waves, or optically (e.g., a radar). In a case where the aircraft equipment accommodated in the nose cone is capable of accessing the outside of the nose cone through the nose cone even if the nose cone is not provided with a transparent portion (e.g., in a case where the aircraft equipment is radio wave utilizing equipment), the entire nose cone may be made non-transparent.

Embodiment 4

Figure 5:
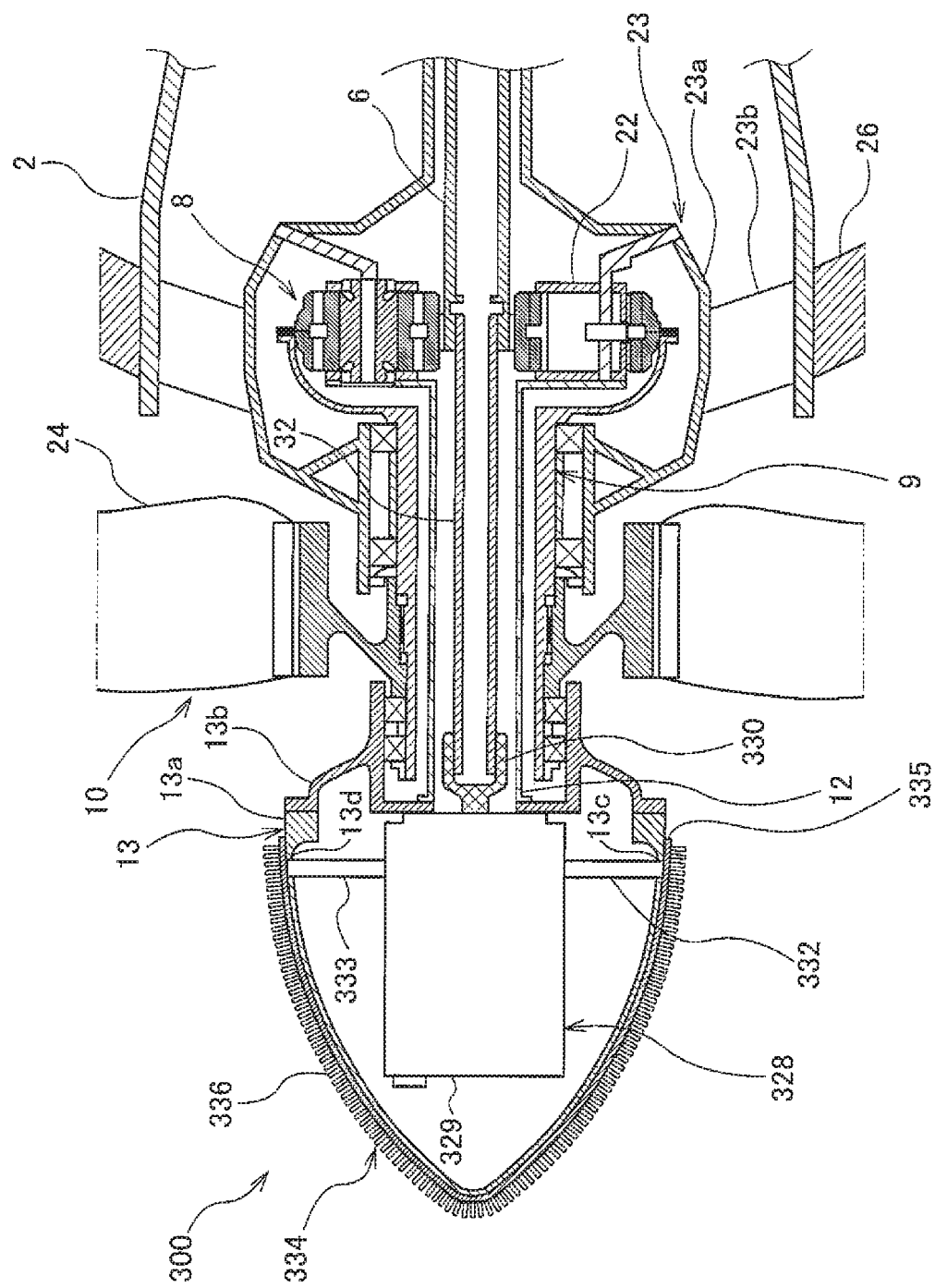
FIG. 5 is an enlarged sectional view of a fan and its vicinity of an aircraft engine apparatus according to Embodiment 4.

FIG. 5 is an enlarged sectional view of the fan 10 and its vicinity of an aircraft engine 300 according to Embodiment 4. As shown in FIG. 5, the nose cone 13 is provided with a heat exchanger 334 as aircraft equipment. For example, the heat exchange 334 is an oil cooler. In a power generator 328 accommodated in the nose cone 13, a predetermined cooling fluid (e.g., part of oil flowing inside a housing 329) is circulated inside the housing 329 so that the cooling fluid can exchange heat with, and thereby cool down, heat-generating components in the housing 329. Provided outside the power generator 328 are: piping 332 for discharging the cooling fluid that has been used to exchange heat with the heat generating components in the housing 329 to the outside; and piping 333 for introducing the cooling fluid that has been cooled down into the power generator 328. The piping 332 and the piping 333 are inserted in an insertion hole 13c and an insertion hole 13d, respectively, which are formed in the nose cone 13. The piping 332 and the piping 333 are coupled to the heat exchanger 334 mounted along the outer surface of the nose cone 13.

As one example, the heat exchanger 334 is of a surface type and includes a body 335 and a plurality of radiation fins 336. The body 335 is a thin box-type casing, and includes a plate (not shown) therein, on which corrugated fins are formed. The corrugated fins form a plurality of channels, which are configured such that the cooling fluid is allowed to flow through the channels. The plurality of radiation fins 336 are thermal-coupled to the body 335 in a state where the fins 336 are provided upright on the outer surface of the body 335.

The cooling fluid that has been used to cool down the power generator 328 is fed to the body 335 of the heat exchanger 334 through the piping 332. While the engine is being driven, a large amount of outside air comes into contact with the radiation fins 336 of the heat exchanger 334. This allows the cooling fluid flowing inside the body 335 to exchange heat well with the outside air, and as a result, the cooling fluid is cooled down. The cooling fluid also exchanges heat with the nose cone 13 via the body 335, and is thereby cooled down. Accordingly, the cooling fluid that has been sufficiently cooled down can be returned into the housing 329 through the piping 333, and reused for the heat exchange with each component in the housing 329. Thus, when the power generator 328 performs electric power generation, the power generator 328 can be favorably cooled down by the cooling fluid. Therefore, improvement in power generation efficiency can be expected. Moreover, since the nose cone 13 is provided with the heat exchanger 334, the piping 332 and 333 of the cooling fluid for cooling down the power generator 328 can be shortened. This makes it possible to suppress weight increase due to the installation of the heat exchanger 334 and the piping 332 and 333 to some extent. It should be noted that the heat exchanger is not limited to the surface type that is in surface contact with the nose cone, but may be of a different type. For example, although the heat exchanger 334 in the present embodiment has a conoid shape and is provided along the cone portion 13a of the nose cone 13, the heat exchanger 334 may have a different shape.

(Other Matters)

It should be noted that the present invention is not limited to the above-described embodiments, and various modifications, additions, or deletions can be made to the embodiments without departing from the spirit of the present invention. The above-described embodiments may be combined with each other in any manner. For example, part of a configuration or method described in one embodiment may be applied to another embodiment.

In the above-described embodiments, aircraft equipment is accommodated in the nose cone. However, as an alternative, no aircraft equipment may be accommodated in the nose cone. In a case where no equipment is accommodated in the nose cone, or in a case where the equipment accommodated in the nose cone is equipment that does not need mechanical driving force, the drive shaft 32 may be eliminated. Each of the above-described embodiments illustratively shows a configuration in which the coupling member and the low-pressure shaft are coupled via the transmission. However, the transmission is not an essential component. Alternatively, the coupling member and the low-pressure shaft may be coupled via a motive force transmitting mechanism that includes a space through which the support member passes. Examples of such an adoptable motive force transmitting mechanism include: a mechanism in which the number of gears is modified such that the input gear 87, the plurality of two-stage gears 88, and the output gear 89, which are shown in FIG. 3, transmit the motive force at a constant speed; and a mechanism in which the motive force is transmitted at a constant speed by means of a belt. In each of the above-described embodiments, the torque tube may be indirectly coupled to the casing via the transmission by coupling the torque tube to the transmission that is coupled to the casing, or alternatively, the torque tube may be directly coupled to the casing without via the transmission.

In a case where the drive shaft is disposed radially inward of the torque tube, the torque tube may pivotally support the drive shaft 32 via a bearing. The coupling member 9 or 109 may be pivotally supported by a different bearing, for example, one provided on the outer periphery of the torque tube 12 or 112. The transmission in each of the above-described embodiments may be configured by using a continuously variable transmission. For example, the continuously variable transmission may be a belt-driven continuously variable transmission including a plurality of pulleys and a belt that transmits motive force between the plurality of pulleys. In this case, the torque tube may be provided such that the torque tube passes through a space formed between the plurality of pulleys.

REFERENCE SIGNS LIST 1, 100, 200, 300 aircraft engine apparatus
2 casing
6 low-pressure shaft (rotating shaft)
8, 108 transmission
9, 109 coupling member (first motive force transmitter)
10, 110 fan
11 fan case
12, 112 torque tube (support member)
13, 213 nose cone
19 sun gear
20 planetary gear
21 ring gear
22 carrier
28, 328 power generator (aircraft equipment)
228 camera (aircraft equipment)
334 heat exchanger (aircraft equipment)
S space

The invention claimed is:
1. An aircraft engine apparatus comprising:
a rotating shaft;
a fan that includes a fan hub and a plurality of fan blades coupled to the fan hub such that the fan blades are arranged at intervals in a circumferential direction and extend in a radial manner, the fan being driven by the rotating shaft;
a fan case surrounding the fan from outside in a radial direction of the rotating shaft;
a nose cone disposed upstream of the fan;
a casing that accommodates at least part of the rotating shaft and supports the fan case;

a coupling member that transmits motive force of the rotating shaft to the fan and is a hollow member extending in an axial direction of the rotating shaft;

a transmission that is disposed downstream of the fan and couples the rotating shaft to the coupling member; and a support member disposed inward of the coupling member in the radial direction, the support member coupling the nose cone to the casing such that the support member supports the nose cone in a stationary state, wherein the nose cone is held in a fixed state to the casing by the support member.

2. The aircraft engine apparatus according to claim 1, wherein upstream of the fan, the nose cone is mechanically spaced apart from the fan case.

3. The aircraft engine apparatus according to claim 1, wherein the support member is a torque tube that extends inside the coupling member in a direction of an axis of the rotating shaft.

4. The aircraft engine apparatus according to claim 3, wherein the transmission includes a space, through which the support member passes, and the support member passing through the space is coupled to the casing.

5. The aircraft engine apparatus according to claim 1, wherein the transmission includes an unmovable part fixed to the casing, and the support member is coupled to the casing via the unmovable part.

6. The aircraft engine apparatus according to claim 5, wherein the transmission is a star-type planetary gear mechanism including:

a sun gear;

a plurality of planetary gears meshed with the sun gear;

a ring gear meshed with the plurality of planetary gears; and a carrier that supports the plurality of planetary gears, such that the planetary gears are rotatable, and the unmovable part is the carrier.

7. The aircraft engine apparatus according to claim 6, wherein the coupling member includes a tubular body portion extending in the direction of the axis, and an expanded diameter portion provided on one end of the tubular body portion, the one end being adjacent to the transmission the expanded diameter portion is coupled to the ring gear and partially covers an outer periphery of the ring gear.

8. The aircraft engine apparatus according to claim 1, further comprising aircraft equipment provided in the nose cone.

9. The aircraft engine apparatus according to claim 8, wherein the aircraft equipment is a heat exchanger.

10. The aircraft engine apparatus according to claim 8, wherein a wiring connected to the aircraft equipment extends along an outer periphery of the support member.

* * * * *